United States Patent [19]
Hill et al.

[11] 4,101,334
[45] Jul. 18, 1978

[54] COATED GLASS FIBERS

[75] Inventors: Homer G. Hill, Newark; William G. Pansius, Granville, both of Ohio

[73] Assignee: Owens-Corning Fiberglas Corporation, Toledo, Ohio

[21] Appl. No.: 753,746

[22] Filed: Dec. 23, 1976

[51] Int. Cl.² .............................................. C04B 7/02
[52] U.S. Cl. ....................................... 106/99; 106/120
[58] Field of Search .................. 106/99, 120; 428/375

[56] References Cited

U.S. PATENT DOCUMENTS

| | | | |
|---|---|---|---|
| 2,738,285 | 3/1956 | Biefeld et al. | 106/99 |
| 2,793,130 | 5/1957 | Shannon et al. | 106/99 |
| 3,461,090 | 8/1969 | Haynes et al. | 428/375 |
| 4,013,478 | 3/1977 | Meyer | 106/99 |
| 4,015,994 | 4/1977 | Hill | 106/99 |

*Primary Examiner*—J. Poer
*Attorney, Agent, or Firm*—Ronald C. Hudgens; Patrick P. Pacella; Keith V. Rockey

[57] ABSTRACT

A glass fiber reinforced cementitious product and treated glass fibers for use in the reinforcement of cementitious materials wherein the reinforcement is in the form of bundles of glass fibers, the bundles including an alkali impervious impregnant therein to protect the glass fibers from alkaline materials liberated during age hardening of cementitious products. The use of impregnated bundles of glass fibers prevents or substantially minimizes loss in strength with aging of glass fiber-reinforced cementitious products as is characteristic of prior art products.

23 Claims, 7 Drawing Figures

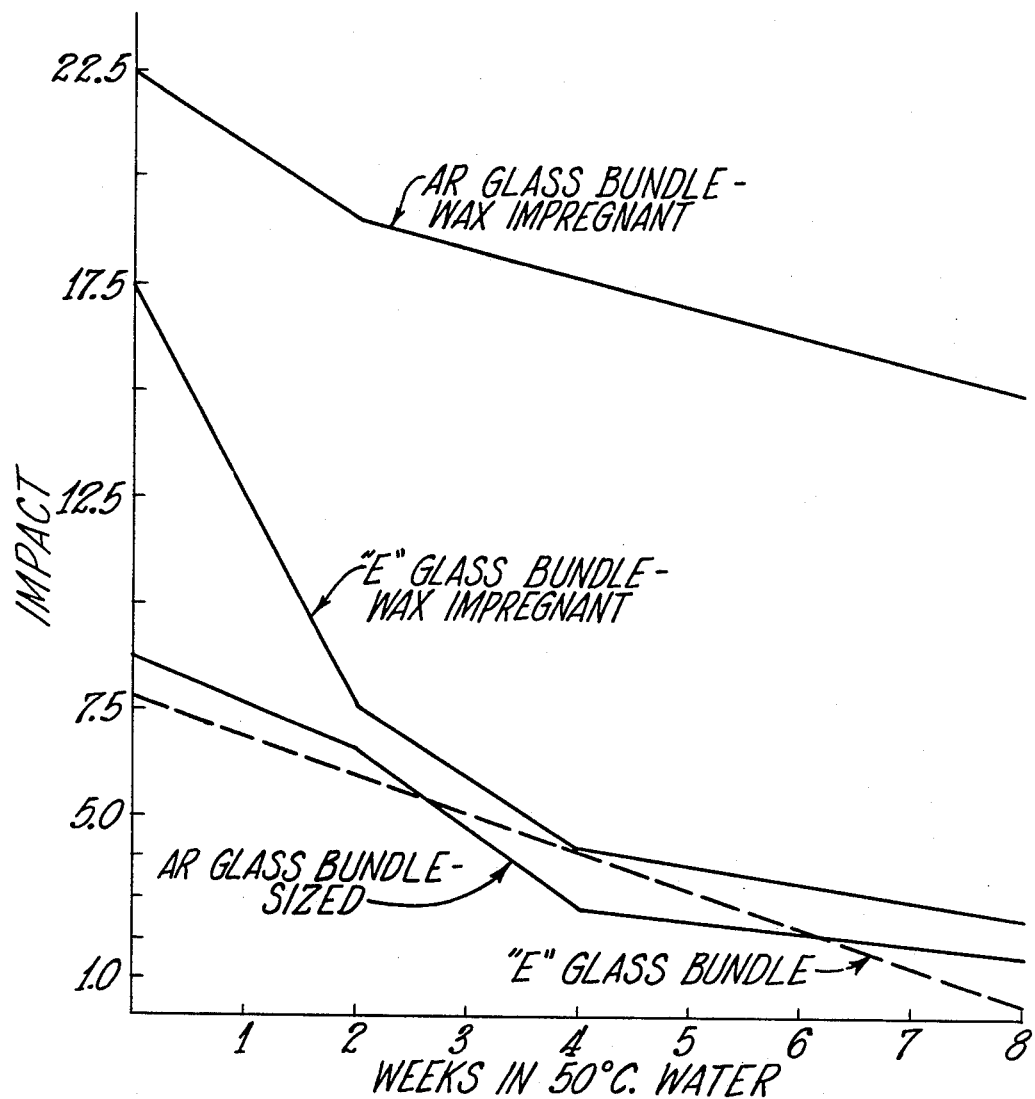

COATED GLASS FIBERS

This invention relates to glass fibers coated with an alkali impervious coating and more particularly to impregnated bundles of glass fibers for use in the reinforcement of cement and concrete wherein the bundles are impregnated with alkali impervious material.

It has long been known, as described in Slayter U.S. Pat. Nos. 2,703,762 and 2,781,274, to employ glass fibers in the reinforcement of cementitious products, including hydrous calcium silicate crystals, cement, concrete, mortar and like matrices having a high alkali content. Glass fiber reinforcement contributes significantly to the overall strength of such cementitious products by reason of the high strength and flexibility of the glass fibers.

One of the primary difficulties which has been incurred in the use of glass fibers in the reinforcement of alkali cementitious products items arises from the fact that such cementitious products continuously age harden, giving off water of hydration. This, in turn, results in the formation of calcium hydroxide with the reinforced product which tends to slowly lessen the effectiveness of glass fibers. The net result is an overall loss of composite strength and ductility accompanying the aging of the glass fiber reinforced cementitious product. For that reason, it has not been advisable to employ glass fiber-reinforced cementitious products for long term, that is, five years or more, in load-bearing applications.

It has been proposed, as described in U.S. Pat. No. 3,839,270 as well as in the foregoing Slayter patents, to size the glass fibers with an impervious, alkali resistant coating material in an effort to protect the glass fibers from the deleterious effects of alkaline calcium hydroxide generated during the hardening of the cementitious material.

There are two known methods of coating glass fibers. The first method, referred to in the art as coating during forming, involves the application of coating material to glass fibers as they are being formed. Glass is melted in a glass melting furnace equipped with a bushing on the bottom side, and the molten glass flows through the openings in the bushing to form streams of glass fibers which are rapidly attenuated into fine glass filaments. The filaments are provided with a thin-film coating or sizing as they are formed just before the glass fiber filaments are gathered together to form a strand.

Another method of coating glass fibers involves impregnation of strands, yarns, threads or cords, generally referred to in the art as bundles. In the impregnation of such bundles, the bundle is immersed in a bath of impregnating composition and subjected to a sharp bend while immersed therein to open the bundle and allow the impregnating material to fully penetrate the bundle and fill the interstices between the individual glass fiber filaments while at the same time, forming a coating around each of the glass fiber filaments.

In recent years, alkali resistant glass fibers have achieved widespread acceptance. Such alkali resistant glass fibers are described in U.S. Pat. Nos. 3,840,379; 3,861,927; and 3,861,926. It is now generally recognized that glass fibers formed from glass as described in such patents have significantly greater alkali resistance than other conventional glass fibers, such as "E" glass fibers which have been in commercial use for some time and are described in U.S. Pat. No. 2,334,961.

It has been further proposed, as described in U.S. Pat. No. 3,887,386, to employ in the reinforcement of cementitious products alkali resistant glass fibers, the theory being that the alkali resistant glass forming such glass fibers will not be deleteriously affected by the alkali generated during the age hardening of the cementitious product in which the glass fibers are distributed as reinforcement. While the use of alkali resistant glass fibers does improve the long term stability of glass fiber reinforced cementitious products, there is still a pronounced tendency for the glass fiber reinforced product to lose strength during aging.

It is, accordingly, an object of the present invention to provide an improved coated glass fiber suitable for use in the reinforcement of cementitious products wherein the glass fiber reinforced cementitious products retain their mechanical properties during age hardening.

It is a more specific object of the present invention to provide bundles of alkali resistant glass fibers that are impregnated with an alkali impervious material suitable for use in the reinforcement of cementitious products whereby the glass fiber reinforced cementitious products retain high levels of mechanical properties over extended periods of time.

It is yet another object of the invention to provide cementitious products reinforced with bundles of alkali resistant glass fibers impregnated with an alkali impervious material whereby the reinforced cementitious products maintain high levels of strength over extended periods of time.

Still another object of the invention is to provide cementitious products reinforced with bundles of glass fibers impregnated with an alkali impervious wax material whereby the reinforced cementitious products maintain high levels of strength over extended periods of time.

These and other objects and advantages of the invention will appear more fully hereinafter as for purposes of illustration but not of limitation, an embodiment of the invention is described together with the accompanying drawings wherein:

FIG. 7 is a graph of the variation of Charpy impact strength with aging of glass fiber reinforced cementitious products.

Figure 1:
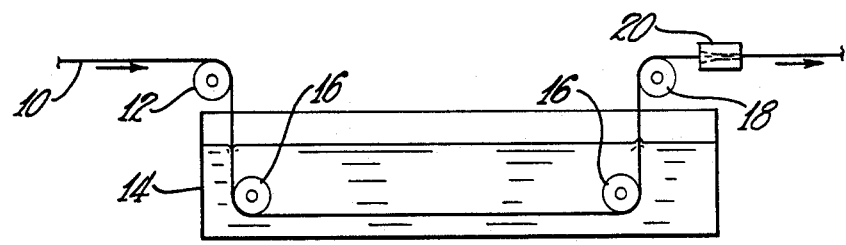
FIG. 1 is a flow diagram, illustrating a treatment of bundles of glass fibers to impregnate the bundles with alkali impervious material.

In a broad sense, the present invention resides in a fiber reinforcement suitable for reinforcement of a cementitious product and in the reinforced product itself. In another sense, the invention resides in a reinforcement for cementitious articles including a bundle of fibers, such as alkali resistant glass fibers, that is, thoroughly impregnated with alkali impervious material, such as wax, and in the reinforced cementitious product.

Concepts of the present invention reside in the discovery that significant improvements in the mechanical properties of glass fiber reinforced cementitious products can be achieved through the use of bundles of alkali resistant glass fibers which have been thoroughly impregnated with an alkali impervious wax material whereby the wax material serves to permeate the bundle of glass fibers and hence saturate bundle interstices. It has been found that when alkali resistant glass fibers treated in this manner and then combined with cementitious materials in the manufacture of glass fiber reinforced cementitious products in accordance with known procedures, the glass fiber reinforced cementitious products produced have unexpectedly high mechanical properties, including elongation and Charpy impact strength. What is even more surprising with respect to glass fiber reinforced cementitous products in accordance with this invention is the fact that those mechanical properties, while initially higher, remain at unexpectedly high levels even though the glass fiber reinforced cementitious products are subjected to extensive aging.

In a broad sense, this invention can use any of the well known glass fibers or alkali resistant glass fibers although in a preferred form of the invention uses alkali resistant glass fibers. Alkali resistant glass fibers are now well known to those skilled in the art and are commercially available. In general, the glass from which such alkali resistant glass fibers are formed contains relatively high levels of zirconia, usually in amounts of the order of 5–25%. Most alkali resistant glass fibers are formulated of glasses having the following major components:

|  | Parts by Weight |
| --- | --- |
| $SiO_2$ | 55 – 80% |
| Alkaline earth metal oxide(s) (CaO, MgO, BaO, etc.) | 4 – 20% |
| Alkali metal oxide(s) ($Na_2O$, $K_2O$, etc.) | 1 – 20% |
| $ZrO_2$ | 5 – 25% |
| $TiO_2$ | 0 – 10% |

In addition, such alkali resistant glasses may also contain small amounts of alumina, chromium oxide, tin oxide and the like.

There are many other well known glass fibers that are commercially available. The most widely known of these are "E" glass fibers, which are described in U.S. Pat. No. 2,334,961 issued on Nov. 23, 1943. The impregnant must be impervious to alkali materials so that the impregnant does not break down when subjected to alkali materials, such as calcium hydroxide, generated during age hardening of the cementitious products with which the glass fibers are combined as reinforcement. It is preferred to employ wax coating materials, and preferably waxes containing functional groups capable of reaction with the free hydroxyl groups contained on the glass fiber surfaces. For this purpose, it is frequently preferred to employ saponifiable waxes, oxidized waxes and sulfonated waxes.

In many applications, impregnated glass fiber bundles are combined with cementitious materials in accordance with known techniques such as the use of a spray gun in which the glass fiber bundles are chopped, combined with cement and sprayed onto a surface to form the glass fiber reinforced cementitious product. For that purpose, it is generally desired to employ a wax of the sort described above having a relatively high melting point to avoid tackiness and to provide some degree of brittleness to insure that the chopping equipment completely chops the impregnated glass fiber bundles prior to ejection from the chopping gun. Polymeric wax blends have been found to be highly suitable for this purpose; such polymeric wax blends are microcrystalline waxes blended with the product formed by copolymerization of an olefin, such as ethylene or propylene, with vinyl esters, such as vinyl acetate.

However, it is believed a wide variety of alkali impervious impregnants may be used in the practice of this invention. These might include polyester resins, phenolic novolak resins such as those formed by condensation with a phenolic compound such as phenol with a lower aliphatic aldehyde such as formaldehyde, epoxy novolak resins, furan resins, polyamides, polyepoxides, rubber (natural and synthetic latices such as SBR rubber) and like materials as well as blends of these materials.

Many alkali impervious wax materials are commercially available. Preferred commercially available microcrystalline waxes include: Eluax from DuPont; Candelilla wax from Frank B. Ross Co., Inc.; and Bakelite Co-Mer resin EVA 301 from Union Carbide. Waxes pliable at room temperature are normally preferred.

Bundles of the glass fibers, in the practice of this invention, can be impregnated with the alkali impervious resinous coating material in accordance with known techniques.

In a preferred form of the invention, it is important to thoroughly impregnate the glass fiber bundle to saturate or to permeate the interstices of the bundle and thereby reduce voids in the bundle to a minimum. From a practical stand point, the bundle should be at least 60% permeated with the alkali impervious material, and preferably at least 80% permeated.

An impregnation technique is illustrated in FIG. 1 of the drawing. As shown in this figure, a bundle 10, which is formed of a plurality of alkali resistant glass fibers, is passed over a roller 12 and is immersed to travel through a bath 14 containing the alkali resistant material dispersed in aqueous medium or in the form of a hot melt. As the bundle 10 is passed over the roller 12 and into the bath 14 of the impregnant material, it is passed over a pair 16 of rollers immersed in the impregnant whereby the bundle 10 is subjected to a sharp bend to open the bundle and permit the solids of the impregnating material to penetrate the glass fiber bundle and fill the interstices between the individual glass fibers of the bundle.

After passage through the impregnant bath 14, the bundle 10 is moved from the bath and passed over a roller 18 and through a roller or die 20 which serves to remove excess impregnating composition from the bundle and to work the solids of the impregnant composition into the bundle. The impregnated bundle is then dried, either by air drying or passage through an oven in accordance with known techniques to remove the aqueous diluent from the impregnant or cooled in a water bath in the case of hot-melt treatment.

Figure 3:
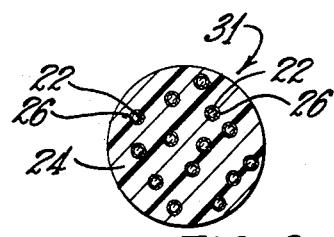
FIG. 3 is a cross sectional view of a bundle of glass fibers in which the individual glass fiber filaments have a thin size coating on the surfaces thereof, the bundle having been subjected to impregnation by the procedure schematically illustrated in FIG. 1.
Figure 4:
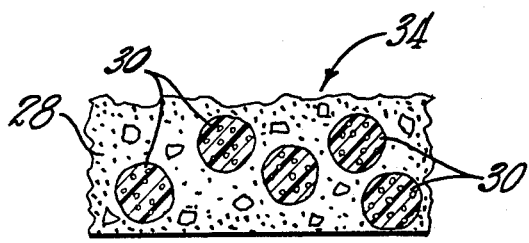
FIG. 4 is a cross sectional view of a cementitious product reinforced with bundles of glass fibers processed in accordance with this invention.
Figure 5:
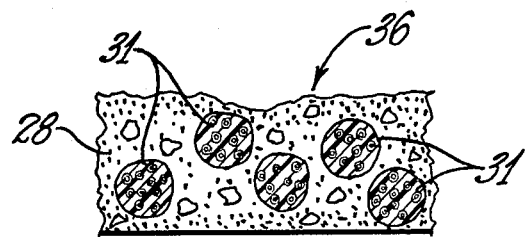
FIG. 5 is a cross sectional view of a cementitious product reinforced with bundles of glass fibers processed in accordance with this invention. The individual glass fiber filaments have a thin size coating on their surface such as in FIG. 4.

The resulting bundle is shown in cross section in FIG. 3 of the drawing. As can be seen from this figure, individual glass fibers 22 forming the bundle are each coated by the solids of the impregnant 24. The impregnant 24 thus serves to coat the individual glass fibers and to fill the space between them to form a unitary bundle structure. This configuration not only serves to protect the glass fibers from the effects of alkali generated during the aging of cementitious products, but also serves to keep matrix material from the interior of the bundle. This keeps the bundle flexible in cementitious products and, therefore, the unitary bundle structure is kept at a different modulus from the matrix. This relationship between the unitary bundle structure and matrix discourages crack propagation.

Normally, glass fibers are sized in the fiber forming operation. As is now well known, size compositions frequently used in the coating of glass fibers can be formulated to include an organo silicon compound, usually in the form of an organo silane or its hydrolysis product, whereby the organo silicon compound serves to promote a more secure bonding relationship between the individual glass fiber filaments and the alkali impervious coating material forming the bundle in which the sized glass fibers are distributed.

This concept of the present invention as illustrated in FIG. 3 shows the individual glass fibers 22 with a thin film coating 26 on the individual surfaces thereof. The primary advantage in the use of sized glass fibers stems from the fact that size compositions impart to the glass fiber surfaces lubricity, and thereby prevent or substantially minimize destruction through mutual abrasion of the individual glass fiber filaments during processing.

The amount of the impregnant material applied to the glass fiber bundles should be an amount sufficient to protect the glass fibers from alkaline materials by thoroughly penetrating the bundle to fill the interstices between the individual glass fiber filaments and to form a coating about each of the individual glass fiber filaments. Various amounts of impregnant can be used for this purpose; good results are obtained when the amount of a wax impregnant varies from 10–60% by weight as determined by loss on ignition, and preferably 20–50% by weight.

The impregnated bundles of glass fibers can be combined with cementitious materials in accordance with well known procedures. Various cementitious materials can be used for this purpose, including cement, Portland cement, concrete, mortar, gypsum and hydrous calcium silicate.

Impregnated bundles of glass fibers can be combined with the cemtitious material in a variety of ways, e.g., by spraying or molding composites of the cementitious materials and the glass fiber bundles.

If desired, it is believed possible to use other fibrous materials, in addition to the impregnated bundles of glass fibers. These include asbestos fibers, mineral wool or organic fibers or materials (e.g., wood fibers, pulp fibers, cotton, straw, bagasse, wood flour, hemp, rayon and the like).

Figure 2:
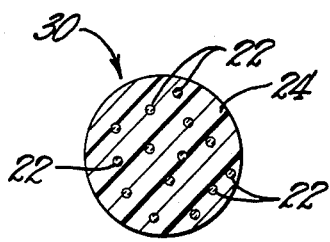
FIG. 2 is a simplified cross sectional view of a bundle of glass fibers which has been impregnated in accordance with the procedure diagrammatically illustrated in FIG. 1.

The glass fibers, whether employed as reinforcement in the form of continuous impregnated bundles or chopped strands formed from impregnated bundles, are distributed throughout the cementitious material whereby the cementitious material forms a continuous phase. By way of illustration, a cross section of a glass fiber bundle reinforced cementitious material 34 is shown schematically in FIG. 3. In this figure, the cementitious material 28 represents the cementitious material forming the continuous phase whereas the impregnated bundles of glass fibers distributed throughout the cementitious material are represented as 31, randomly dispersed in the cementitious material matrix. The individual glass fiber filaments have a thin size coating on their surfaces such as in FIG. 2.

The amount of glass fibers employed can be varied within relatively wide ranges. Usually good reinforcement is obtained where wax impregnated glass fiber bundles are employed in an amount sufficient to constitute between 1 and 40% by weight of the cementitious material.

Having described the basic concepts of the invention, reference is now made to the following example which is provided by way of illustration, and not by way of limitation, of the practice of the invention in the manufacture of wax impregnated alkali resistant glass fiber bundles and reinforced cementitious products made therefrom.

EXAMPLE 1

An alkali resistant glass having the following composition

| Ingredient | Weight Percent |
|---|---|
| $SiO_2$ | 61.1 |
| CaO | 5.1 |
| $Na_2O$ | 14.4 |
| $K_2O$ | 2.6 |
| $ZrO_2$ | 10.4 |
| $TiO_2$ | 6.0 |
| $Al_2O_3$ | 0.3 |
| $Fe_2O_3$ | 0.2 | is formed into glass fibers using conventional techniques. The glass fibers, in the form of a bundle of closely grouped glass fibers, are then subjected to impregnation with a hot-melt impregnating composition at a temperature of 130°–140° C formulated as follows:

| | |
|---|---|
| Microcrystalline wax (Paxwax 6413 from National Wax Co., Skokie, Ill.) | 80% |
| Ethylene-vinyl acetate copolymer (EVA 301) | 20% |

Impregnation is carried out in accordance as illustrated in FIG. 1 of the drawing, after which the impregnated bundles of glass fibers are quenched in a water bath to set the impregnant.

Using conventional techniques, chopped bundles of the impregnated alkali resistant glass fibers are then combined with cement to form a glass fiber bundle reinforced cementitious product.

The cementitious product is then tested to determine its mechanical properties, including percent elongation and Charpy impact strength.

For purposes of comparision, alkali resistant glass fibers prepared from the composition described above are sized in forming with a size composition containing polyvinyl acetate, and then combined with cement using the same procedures as described above. The cementitious products thus formed are also subjected to testing.

For further comparison, glass fibers formed from "E" glass are subjected to impregnation in the same way and combined with cement, and untreated "E" fibers are also combined with cement. In each of the comparative tests, the same techniques for combining the glass fiber bundles with the cement was used, and with the same proportions.

Figure 6:
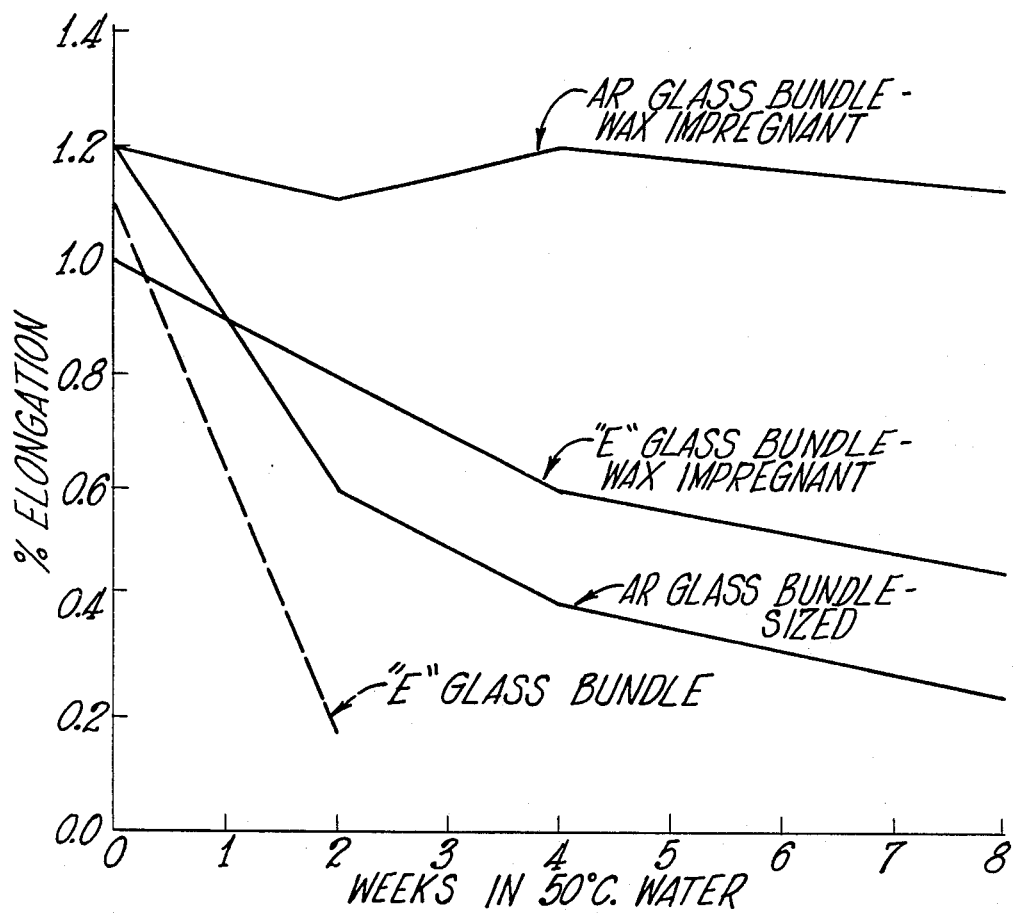
FIG. 6 is a graph, illustrating the variation of total elongation of glass fiber reinforced cementitious products with aging.

The results of these tests are shown in FIGS. 6 and 7 of the drawing. These figures plot total elongation versus weeks of immersion in water maintained at 50° C and Charpy impact versus weeks of immersion in water maintained at 50° C, the water providing an artificial aging condition.

Referring initially to FIG. 6 of the drawing, it will be seen that the glass fiber reinforced cementitious product prepared from glass fibers processed in accordance with the present invention (alkali resistant glass bundle — wax impregnant) maintain a substantially constant elongation after aging for 8 weeks in hot water; whereas the "E" glass fiber bundles, othewise processed in the same manner, "E" glass bundle — wax impregnant, have a significantly lower elongation. All glass strand diameters shown in the drawings corresponded to 7500 yds./lb.

The bundle of alkali resistant glass fibers containing only a thin size coating, identified as alkali resistant glass bundle — sized, show a drastic loss in elongation after accelerated aging for several weeks in hot water. It has been determined experimentally that the size coating on the glass fibers is removed within about 2 weeks of the time that the cementitious product is immersed in the water, and thus that test approximately corresponds to the use of untreated alkali resistant glass fibers in the reinforcement of cement. The "E" glass bundle, untreated in any fashion, also shows a drastic decrease in elongation.

Even more dramatic improvements in the present invention can be seen by reference to FIG. 7, a plot of Charpy impact strength versus time of immersion in 50° C water. There it is shown that the reinforced product formed from the alkali resistant glass fiber bundle treated with an alkali impervious material in accordance with the present invention has a significantly higher Charpy impact strength which is maintained over 8 weeks of artificial aging. In contrast, the "E" glass treated in the same manner provides a cementitious product in which the Charpy impact strength decreases much more rapidly, from a lower initial value. Even lower Charpy impact strengths are obtained for cementitious products reinforced with alkali resistant glass fiber bundles which have simply been sized or with cementitious products reinforced with untreated "E" glass fiber bundles.

While the invention has been described with reference to the use of a blend of a microcrystalline wax and an ethylene-vinyl acetate copolymer, it will be understood that various other alkali resistant materials can likewise be used as the impregnating material to provide equivalent results.

It will be understood that various changes and modifications can be made in the details of procedure, formulation and use without departing from the spirit of the invention, especially as defined in the following claims.

We claim:

1. A cementitious product comprising a composite of reinforcing materials and a cementitious matrix wherein one of the reinforcing materials comprising bundles formed of a plurality of alkali resistant glass fibers, said bundles including an alkali impervious impregnant which coats the glass fibers and penetrates the bundles to fill the interstices between the glass fibers separating each from the other.

2. A cementitious product as defined in claim 1 wherein the alkali impervious impregnant is an organic resin.

3. A cementitious product as defined in claim 1 wherein the impregnant is a wax containing functional groups capable of reaction with free hydroxyl groups.

4. A cementitious product as defined in claim 1 wherein the impregnant includes a microcrystalline wax.

5. A cementitious product as defined in claim 1 wherein the impregnant includes a copolymerization product of an olefin with vinyl esters.

6. A cementitious product as defined in claim 5 wherein the copolymerization product is an ethylene-vinyl acetate copolymer.

7. A cementitious product as defined in claim 1 wherein the alkali resistant glass is a high zirconia glass.

8. A cementitious product as defined in claim 1 wherein the individual glass fibers forming the bundle have a thin size coating on the surfaces thereof.

9. A cementitious product as defined in claim 1 wherein the impregnant constitutes 10–60% by weight of the impregnated glass fiber bundle, as determined by loss on ignition.

10. A cementitious product as defined in claim 1 wherein the cementitious matrix is Portland cement.

11. A cementitious product as defined in claim 1 wherein the cementitious matrix is hydrous calcium silicate.

12. A cementitious product as defined in claim 1 wherein the cementitious matrix is cement.

13. A cementitious product as defined in claim 1 wherein the cementitious matrix is concrete.

14. A cementitious product as defined in claim 1 wherein the cementitious matrix is mortar.

15. A cementitious product as defined in claim 1 wherein at least 80% of the interstices between the glass fibers of the bundle are filled with the alkali impervious impregnant.

16. A cementitious product as defined in claim 1 wherein the alkali impervious impregnant penetrates the bundle to substantially completely fill the interstices between the glass fibers.

17. A cementitious product comprising a composite of reinforcing materials and a cementitious matrix wherein one of the reinforcing materials comprising bundles formed of a plurality of glass fibers, said bundles including an impregnant of a wax impervious to alkali which coats the glass fibers and penetrates the bundles to fill the interstices between the glass fibers separating each from the other.

18. A cementitious product as defined in claim 17 wherein the glass fibers are made of "E" glass.

19. A cementitious product as defined in claim 17 wherein the wax is a microcrystalline wax.

20. A cementitious product as defined in claim 17 wherein the impregnant includes a polymerization product of an olefin with vinyl esters.

21. A cementitious product as defined in claim 17 wherein the individual glass fibers forming the bundle have a thin size coating on the surfaces thereof.

22. A cementitious product as defined in claim 17 wherein the impregnant constitutes 10–60% by weight of the impregnated glass fiber bundle, as determined by loss on ignition.

23. A cementitious product as defined in claim 20 wherein the polymerization product is an ethylene-vinyl acetate copolymer.

* * * * *